United States Patent [19]
Ohta

[11] Patent Number: 4,601,546
[45] Date of Patent: Jul. 22, 1986

[54] COLOR OPTICAL PRINTER HEAD HAVING LIQUID CRYSTAL LAYER

[75] Inventor: Takahiro Ohta, Kanagawa, Japan

[73] Assignee: Fuji Photo Film Co., Ltd., Kanagawa, Japan

[21] Appl. No.: 573,943

[22] Filed: Jan. 26, 1984

[30] Foreign Application Priority Data

Jan. 28, 1983 [JP] Japan .................. 58-11406

[51] Int. Cl.⁴ .................................................. G02F 1/13
[52] U.S. Cl. ............................. 350/339 F; 350/339 R
[58] Field of Search ....................... 350/339 F, 339 R

[56] References Cited

U.S. PATENT DOCUMENTS 4,470,667  9/1984  Okubo et al. .................. 350/339 F

OTHER PUBLICATIONS

Uchida, T. et al., "A Full-Color Matrix Liquid-Crystal Display with Color Layers on the Electrodes," *IEEE Transactions on Electron Devices*, vol. ED-30, No. 5, May 1983, pp. 503-507.

*Primary Examiner*—John K. Corbin
*Assistant Examiner*—Richard F. Gallivan

[57] ABSTRACT

A color optical printer head which can prevent leakage of white light from the interstices between transparent electrodes arranged inside liquid crystal arrays and prevent color mixture, thereby improving color reproducibility. A light blocking layer is formed between transparent electrodes which are adjacently arranged and covered with color filters of different colors and the whole surface which is covered either with the color filter layer or the light blocking layer is further covered with a protecting layer of photo-hardening resin.

3 Claims, 5 Drawing Figures

COLOR OPTICAL PRINTER HEAD HAVING LIQUID CRYSTAL LAYER

BACKGROUND OF THE INVENTION

The present invention relates to a color optical printer head which can optically print characters or patterns on photosensitive materials and more particularly to an optical shutter device which is suitable for colored hard-copy devices.

Liquid crystal elements are currently in wide use for digital display in electric calculators or wristwatches and application of liquid crystal elements for dot-matrix display which can arbitrarily display arabic numerals, Kanji-characters, Kana-characters or picture images is now being studied. Many of those elements are for black-and-white display using TN (torsional nematic) type. FIGS. 1(a) and (b) show the principle of the TN method. As shown in the figure, a nematic liquid crystal is interposed between two glass substrates 1, 2 and the molecules 5 of the liquid crystal have a long axis which is parallel to the substrate face but is distorted in orientation increasingly along the direction of thickness (at the time the electric field is not impressed, FIG. 1(a)). The torsion angle from one glass substrate 1 to the other substrate 2 is 90°. In front of and behind such liquid crystal cells are arranged polarizing plates 3, 4 respectively which cross each other perpendicularly in polarization direction. When white light enters such liquid crystal panels from behind, the light passes through a polarizing plate 3 to be polarized in one direction. When the light enters the liquid crystal, it propagates along said liquid crystal molecules 5 to be rotated in polarizing direction by 90°. The polarizing direction therefore coincides with the polarizing direction of the polarizing plate 4 which is positioned ahead and the light proceeds without being blocked to pass through the polarizing plate 4. When an electric field is impressed on said liquid crystal in the direction of thickness, the liquid crystal molecules 5 are aligned with the direction of electric field in the long axis thereof as shown in FIG. 1(b). If white light is made to enter said element from behind, the light passes through the plate 3 to be polarized in one direction and then propagated through the liquid crystal as it is. The direction of the polarized light is kept perpendicular to the polarizing direction of the plate 4 and hence blocked by the plate 4. The liquid crystal of the TN method is utilized as display element by using such mechanism that the liquid crystal cell becomes opaque when an electric field is impressed while it becomes transparent when an electric field is not impressed. As most of the liquid crystal elements of the TN method, however, are used for black-and-white display by means of opaque-and-transparent elements, the demand for color display has been keenly felt as the use of liquid crystal elements is remarkably expanded. Color display will improve attraction, recognition and diversity of the display and further provides a wider field of vision for some methods.

There have been proposed color display methods by means of liquid crystals using various principles. Typical are the ECB method (electrically controlled birefringence) using the birefringence property of liquid crystals, the GH method (guest-host) which adds a bi-color element to the liquid crystal, and the color TN method in which the elements of the aforementioned TN method are covered with a birefringence color filter or a bi-color filter. FIG. 2 shows the liquid crystal elements of the color TN method wherein multicolor display becomes possible by combining color filters of red, green and blue in the element. More particularly, nematic liquid crystal 12 is inserted between two parallel glass substrates 10, 11 and transparent electrodes 13, 14 in the form of a strip are vapor-deposited in a plural number on the inner faces of said glass substrates 10, 11 in a manner so that they cross each other perpendicularly. When electric voltage is applied to combinations of opposing faces of the transparent electrodes 13, 14, arbitary patterns of matrix become displayable. Color filters of R, G, and B are formed on transparent electrodes 14 shown in the lower part in the figure or the transparent electrodes which are closer to the surface of the liquid crystal display element. The color filters are of color addition mixture and the color filter R transmits red light, the color filter G green light and the color filter B blue light. The reason why color filters R, G and B are provided at such a location is because a higher resolution can be obtained if color filters are located closer to transparent electrodes and because color deviation is less when viewed obliquely if they are provided in a shallow depth or on the electrode 14 rather than the electrode 13.

As liquid crystal becomes opaque or transparent according to the principle described for FIG. 1, if a transmission display type is adapted, it can function as a shutter for light. There has recently been developed a liquid crystal printer head which utilizes such function of liquid crystals for the shutter of a copying machine (refer to Nikkei Electronics, 1982, May 10, p.90-p.92). The liquid crystal shutter is constructed in such a manner that a fluorescent lamp is provided as a light source behind a liquid crystal shutter and the light controlled by the liquid crystal shutter is projected to a photosensitive drum via a focusing system. The liquid crystal shutter array comprises 2000 shutters arranged transversely in a zigzag pattern at the pitch of 100 $\mu$m and the performance thereof is reported to have the resolution of 10 lines/mm. Such optical printer head is comparable to a semiconductor laser printer in the quality of prints and yet the price is less expensive than a laser printer. For such advantages, the development of an optical printer head is much sought after but the technology still remains at the primitive stage of black-and-white display. The technology has only taken the first step toward the multicolor display.

The present inventor has repeatedly studied and conducted experiments for modifying such printer heads for color printing using the aforementioned color TN methods and came to recognize the critical problem that light tends to leak from the periphery of transparent electrodes to cause black strips (in the case of the photosensitive material of negative working) or white strips (in the case of the photosensitive material of positive working), thereby deteriorating the picture quality to a grave extent.

SUMMARY OF THE INVENTION

The present invention aims to provide a color liquid crystal device which can prevent leakage of white light from the periphery of transparent electrodes and prevent the occurrence of black or white strips caused by the ON/OFF control of light in the liquid crystal shutter arrays using the above color liquid crystal device. The present invention aims to provide a printer head which can prevent mixture of different colors which might otherwise be caused between transparent electrodes (to correspond to a picture element) arranged adjacently to each other for improved color reproducibility. From the observation made during the study and experiments is drawn the basic technical concept of this invention: by using a practical means, at least white light is prevented from reaching the output side from any sections other than transparent electrodes no matter which channel the light travels from a light source through a liquid crystal shutter, thereby preventing occurrence of white strips (or black strips in the case of negative working photosensitive material) which hamper the picture quality in prints. In the optical printer head using the liquid crystal shutter arrays according to this invention, there are provided plural shutter arrays to correspond to each color to be resolved, surfaces of respective transparent electrodes comprising such plural liquid crystal shutter arrays are covered with color filters of different colors corresponding to each resolution color, and a light blocking layer is formed between thus covered transparent electrodes which are adjacently arranged to block at least the white light. The optical printer head according to this invention may alternatively be structured in that plural liquid crystal shutter arrays are provided to correspond to each color to be resolved, surfaces of respective transparent electrodes comprising the plural liquid crystal shutter arrays are covered with color filters of different colors corresponding to the resolution colors, a light blocking layer is formed between thus covered transparent electrodes which are adjacently arranged to block at least white light, the whole surface covered either with the color filter layer or the light blocking layer is covered with a protecting layer made of photo-hardening resin.

DETAILED DESCRIPTION OF THE INVENTION

The color printer head according to this invention will now be described in more detail referring to preferred embodiments.

Figure 1A:
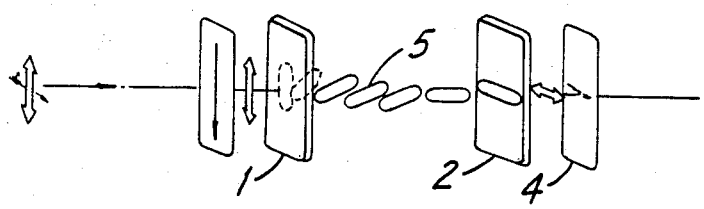
FIGS. 1(a) and (b) show operational principle of liquid crystal according to the TN method.
Figure 1B:
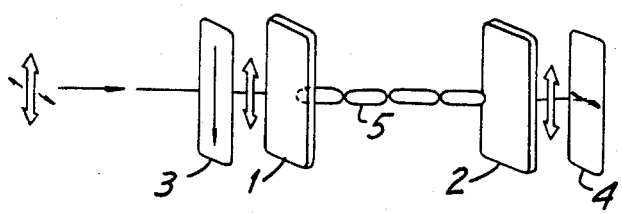
Figure 2:
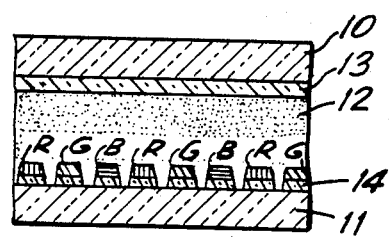
FIG. 2 is a sectional view of a prior art color liquid crystal display element.
Figure 4:
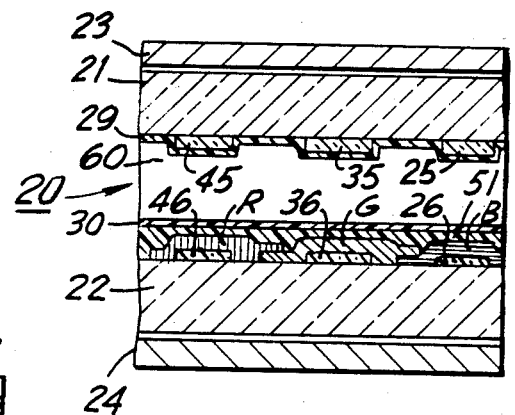
FIGS. 3 and 4 are sectional views of a liquid crystal printer head using the color liquid crystal element according to this invention.
Figure 3:
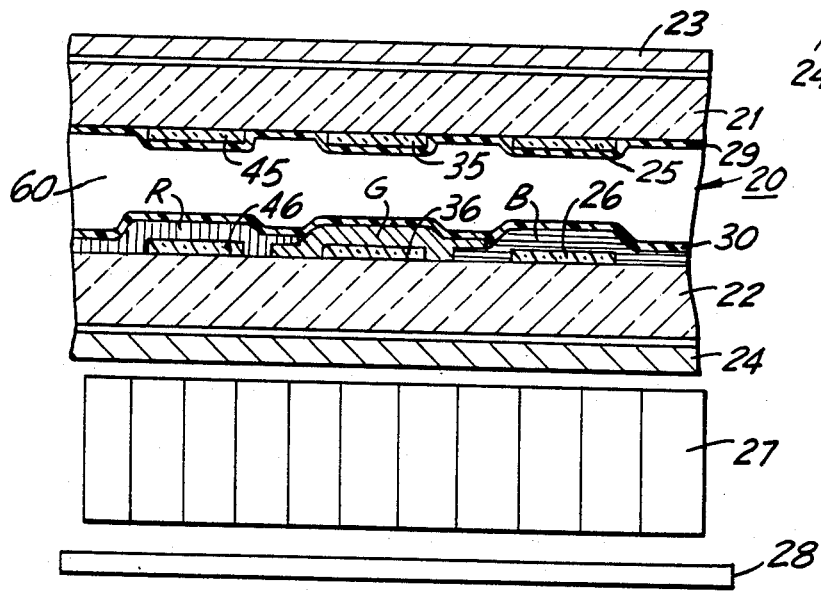

FIGS. 3 and 4 show an embodiment of the color liquid crystal device according to this invention which is applied as a liquid crystal shutter for a liquid crystal printer head. In FIG. 3, the liquid crystal printer head comprises a fluorescent lamp which is a light source, a liquid crystal shutter which colors the light when the fluorescent light is transmitted therethrough and SELFOC lens arrays which project thus colored light onto a color photosensitive paper. More particularly, liquid crystal shutter arrays 20 are mounted in front of a fluorescent lamp (not shown) (at the lower part in FIG. 3). The liquid crystal shutter array 20 is provided with plural transparent electrode arrays 25, 26, 35, 36; and 45, 46 between glass substrates 21, 22 in the direction perpendicular to the surface of the drawing paper at predetermined intervals regularly to hold liquid crystal 60 therebetween. Polarizing plates 23, 24 are mounted on the outer surfaces of the two glass substrates 21, 22 or the side opposite to the side of transparent electrodes.

The thickness of said glass substrates 21, 22 is ca. 1–2 mm while the thickness of liquid crystal 60 is ca. 10–20 $\mu$m. As described hereinabove, when voltage is applied, the liquid crystal 60 is provided with a rotary polarization property to rotate the direction of light by 90°. The polarizing directions of polarizing plates 23, 24 are perpendicular to each other. Therefore, only the portion impressed with voltage transmits light to be lit while the remaining portion blocks light.

The size of an electrode is ca. 80 $\mu$m, the interval between adjacent electrodes on the glass substrate is 20 $\mu$m, and the interval between arrays is 100 $\mu$m or more, and about 1000–2000 $\mu$m. The material of transparent electrodes 25, 26 is generally $In_2O_3$ which is vapor-deposited on glass substrates. As such transparent electrodes 25, 26 are arranged in the form of a dot-matrix, arbitrary letters and patterns can be displayed. Although transparent electrodes corresponding to the shutter opening in a picture element unit are arranged in a dot-matrix form in this embodiment, if necessary, at least one of the transparent electrodes which are opposing each other via liquid crystal or one of the upper or the lower electrode 13 or 14 may be a common linear electrode and the portion impressed with a predetermined voltage at both electrodes (the portion where electrodes 13 and 14 cross in a plane in the figure) may be a liquid crystal shutter array to act as an optical shutter to achieve the same effect.

In the above embodiment, the whole surface of the transparent electrodes 26, 36, 46 on one of the glass substrates of corresponding colors are covered with color filters of different colors R, G, B. The color filters B, G, R protrude from the peripheries thereof to overlap each other on the regions between adjacent transparent electrodes 26–36, 36–46 on the glass substrate 22. The color filters may be arranged on a substrate either in a zigzag pattern or in a mosaic pattern or the filters of three colors may be arranged as a group. The color filters on the laminated portion on the transparent electrode 26 not only act as color filters per se but also act as a light blocking layer to block white light as they overlap each other between electrodes. As the color filters B, G, R are of an additive color mixture system, the overlapped portion does not transmit almost all the light of all wave lengths, becoming black optically. As one of the glass substrates is covered completely with color filters B, G, R, even if light finds a passage around electrodes for some reason, the light should pass through either one of the color filters B, G, R without leaking white light. No black or white strips can therefore occur on a photosensitive paper. The inner face of the glass substrates, transparent electrode surfaces, color filters layers and the surfaces contacting such as light blocking layer are mounted with orientation layers 29, 30 for molecule orientation process. A SELFOC lens array 27 is mounted in front of such liquid crystal shutter array 20 (at lower side in the figure) so that the light which has passed through the liquid crystal shutter array 20 and is colored may be projected onto a color photosensitive paper 28 at an extremely short distance and yet without contact. SELFOC lens arrays 27 may be omitted if a high resolution is not required.

The color liquid crystal display element of the above structure is capable of copying characters, patterns, figures, etc. and simultaneously is capable of preventing occurrence of black or white strips securely. The prints thus obtained are excellent in color separation without color mixture and have excellent color reproducibility.

Conventionally, when liquid crystal is used for color printing, it was considered sufficient if either one of the transparent electrodes was covered with color filters on the upper surface thereof. In reality, however, when liquid crystal printers using a liquid shutter of such structure is used, white light leaks from around the electrodes to generate white or black strips on the photosensitive paper. In order to avoid such defects, according to the present invention, as described hereinabove, all surfaces of the transparent electrode 26 on the side of liquid crystal are covered with color filters B, G, R and simultaneously a light blocking layer is provided near the electrode to prevent white light from being transmitted. In order to prevent the occurrence of black or white strips more effectively, it may be possible to dye the light blocking layer with optical black dye. So far as white light is prevented from being transmitted, white or black strips can be prevented sufficiently from being generated conspicuously. Any other color filters so far as they can prevent white light may be used besides the one mentioned above. FIG. 4 shows another embodiment to achieve the object of this invention wherein parts identical with those shown in FIG. 3 are denoted with identical reference numbers. Transparent electrodes 26, 36, 46 are covered on the whole surfaces thereof with color filters G, B, R of different colors on one of the sides of a liquid crystal shutter array 20. At the same time color filters B, G, R respectively extend on the peripheries thereof to cover the interstices between transparent electrodes in an overlapping fashion on the glass substrate 22. The whole surface is covered with a protecting layer 51 so that the color filter layer will not contact directly the liquid crystal 60. As the protecting layer 51 is laid to cover the filter surfaces before the light blocking layer which covers the filters B, R, G and interstices of electrodes is subjected to molecule orientation processing, it is extremely efficient to prevent dyestuff or the like from mixing into liquid crystal via color filters or changing the color of the filters. As the material for such a protecting layer, transparent organic or inorganic material which does not affect the filter layer or the liquid crystal chemically or physically such as photo-hardening resin may be used. If such a color filter or a protecting layer is provided, it is convenient for undercoating process which improves adhesion between colored resin materials of the color filter layer and the light blocking layer and the transparent electrodes and glass substrate.

As described hereinabove referring to preferred embodiments, the color liquid crystal device according to the present invention can securely prevent leakage of white light; if it is used as a liquid crystal shutter for a liquid crystal printer head, it can produce copies of a supreme picture quality without black or white strips of color mixture.

What I claim is:

1. A color optical printer head comprising: two glass substrates, plural liquid crystal shutter arrays between said two glass substrates, said arrays having transparent electrodes, the surface of transparent electrodes provided on one of said two glass substrates forming said liquid crystal arrays being covered with color filters on the side of the liquid crystal, said color filters being of different colors corresponding to each color to be resolved, and a light blocking layer between adjacent transparent electrodes covered with color filters of different colors on said one glass substrate for preventing at least white light from being transmitted therethrough.

2. A color optical printer head as claimed in claim 1, wherein the light blocking layer extends beyond the periphery of the electrodes and covers the interstices between the electrodes in an overlapping manner.

3. A color optical printer comprising: two glass substrates, plural liquid crystal shutter arrays between said two glass substrates, and arrays having transparent electrodes, the surface of transparent electrodes provided on one of said two glass substrates forming said liquid crystal arrays being covered with color filters on the side of the liquid crystal, said color filters being of different colors corresponding to each color to be resolved, and a light blocking layer between adjacent transparent electrodes covered with color filters of different colors on said one glass substrate for preventing at least white light from being transmitted therethrough, the whole surface covered with said color filters or said light blocking layer being covered with a protecting layer of photo-sensitive resin.

* * * * *